United States Patent Office 3,267,154
Patented August 16, 1966

3,267,154
MIXED SALTS OF ALUMINUM AS ORTHO-
ALKYLATION CATALYSTS
Takeo Hokama, Pittsburgh, Pa., assignor to Koppers
Company, Inc., a corporation of Delaware
No Drawing. Filed Aug. 13, 1963, Ser. No. 301,914
7 Claims. (Cl. 260—619)

This invention relates to the alkylation of hydroxyaromatic hydrocarbons. In one specific aspect, it relates to the selective alkylation of hydroxyaromatic hydrocarbons, particularly phenols, in a ring position ortho- to the hydroxyl group.

Conventional methods of alkylation, such as Friedel-Crafts alkylation, result in a more or less random introduction of alkyl groups onto the ring aromatic hydrocarbons with any preferential alkylation resulting from the steric configuration of the hydroxyaromatic hydrocarbon being alkylated. Friedel-Crafts alkylation involves reacting an aromatic hydrocarbon with a halogenated aliphatic hydrocarbon in the presence of e.g. aluminum chloride. In addition to providing a non-specific distribution of the various alkylated isomers, the Friedel-Crafts alkylation process suffers the additional disadvantage of the rearrangement of the carbon skeleton when branched chain hydrocarbons are introduced.

A great step forward in the alkylation art was made by George G. Ecke and Alfred J. Kolka, who found that certain metal aryloxides were efficient for the selective ortho-alkylation of phenolic bodies when used as described in U.S. Patent No. 2,821,898. In their patent Ecke et al. described the selective ortho-alkylation of phenols using the phenoxy derivatives of such elements as aluminum, magnesium, iron, zinc, phosphorus, arsenic, antimony, bismuth and tin.

The pioneer work of Ecke and Kolka created the illusion that a simple choice of a desired metal phenolate was the key to all of the problems of selective ortho-alkylation. Unfortunately, this hope has not been realized. The metal phenolates (or aryloxides) when used as alkylation catalysts, behave in the unpredictable manner typical of most catalyst systems. Of the phenoxy derivatives included in the Ecke et al. patent, only aluminum phenoxide is an excellent catalyst for ortho-alkylation. Magnesium phenoxide is good, and zinc phenoxide is acceptable. The phenoxides of the other metals specifially named by Ecke and Kolka show a mediocre to poor performance as selective ortho-alkylation catalysts.

The use of metal aryloxides as ortho-alkylation catalysts has engendered numerous problems that were unforseen at the time of their introduction to the art. With respect to the performance of the catalyst, there has been an increasing demand for catalysts capable of providing higher and higher selectivity, as determined by the ratio of ortho- to para-isomers present in the final product. Aluminum phenoxide, which is regarded as an excellent orthox-alkylation catalyst, provides, in many instances, a product mixture having an o/p ratio of 15:1 to 40:1. Less effective phenoxides, such as zinc phenoxide, provide an o/p ratio of only 2:1 to 4:1.

Reaction time, of course, is an important commercial consideration. Many of the metal aryloxides named by Ecke et al. are so sluggish in their behavior that the required reaction time becomes prohibitive. Other important considerations include the stability of the catalyst, particularly to moisture, ease of catalyst recovery and effectiveness of the catalyst on repeated recycle.

One of the unfortunate drawbacks to the use of aluminum phenoxide for selective ortho-alkylation is the instability of the catalyst to moisture absorbed by the system. Precaution must be taken, particularly in the case of continuous and semi-continuous operation where repeated recycle of the catalyst is involved, to eliminate all possibility of moisture entering the system. This is often difficult, because phenols have a high affinity for water.

I have discovered that, unexpectedly, a carefully balanced mixed salt of aluminum provides a good orthoselectivity and at the same time is sufficiently hydrolytically stable to eliminate the problems experienced with moisture absorption upon repeated recycle of the catalyst.

It is, therefore, an object of the present invention to provide a new and economical selective ortho-alkylation process using a hydrolytically stable catalyst.

In accordance with the invention, a hydroxyaromatic hydrocarbon containing at least one reactive hydrogen in a ring position ortho- to a hydroxyl group is reacted with an olefin at an elevated temperature and a pressure up to 3000 p.s.i.g. in the presence of a catalytic amount of a mixed salt of alumnium.

The hydroxyaromatic hydrocarbons useful in the invention include all of those conventionally subjected to the alkylation reactions of the heretofore-known art having at least one reactive hydrogen in a ring position ortho- to a hydroxyl group. The hydroxyaromatic hydrocarbons can be mono- or polynuclear and also mono- or polyhydroxy; most commonly they are the hydroxybenzenes, hydroxynaphthalenes, bis-phenols and their lower alkyl-, phenyl-, benzyl-, halo- and amino-substituted derivatives. Useful starting materials thus include phenol, o-cresol, m-cresol, p-cresol, o-, m-, and p-chlorophenol, 2,5-dichlorophenol, thymol, m-ethylphenol, p-t-butylphenol, carvacrol, mono-bromocarvacrol, catechol, resorcinol, pyrogallol, alpha-naphthol, mono-chloro-beta-naphthol, o-phenylphonol, p-phenylphenol, alpha-anthrol, o-, m-, and p-aminophenol, guaiacol, anol, eugenol and isoeugenol.

The olefins useful for alkylation according to the invention also include all of those commonly known to the alkylation art; in particular mono- or polyolefins, cyclo-olefins, aryl-substituted olefins, and halo-substituted olefins. Conventional alkylating agents are those having up to 8–12 carbon atoms, although high molecular weight olefins up to those containing about 20 carbon atoms can be used. Useful olefins thus include ethylene, propylene, butylene, isobutylene, amylene, isoamylene, hexene, heptene, butadiene, isoprene, chloroprene, diisobutylene, heptadiene, octene, decene, dodecene, hexadecene, octadecene, eicosene, styrene alpha-methylstyrene, 2-phenylpropene-1, 2-phenylbutene-1, and the like.

The catalyst used in the invention is a mixed salt of aluminum having both aryloxide and arylsulfonate groups in an average proportion corresponding to the formula:

$$Al(OAr)_n \cdot (Ar'SO_3)_{3-n}$$

wherein $n$ has an average value of 1.5–2.5 and Ar and Ar' are aryl radicals independently selected from the group consisting of phenyl; lower alkylphenyl, such as o-, m-, and p-tolyl and xylyl; m-hydroxyphenyl; p-hydroxyphenyl; and halophenyl, such as mono- or dichlorophenyl.

The catalyst can be made from the aluminum phenoxide, which is preferably made by reacting a metallic aluminum, an aluminum halide, such as aluminum trichloride, or an aluminum alkoxide, such as aluminum ethoxide, aluminum isopropoxide or aluminum butoxide with a hydroxyaromatic hydrocarbon, such as phenol, a halophenol, a naphthol, a polyhydroxyphenol, a bis-phenol or a lower alkylphenol. Conveniently, the phenol used in the formation of the aluminum aryloxide is that being subjected to alkylation in the process of the invention, or one of those which is obtained as an alkylation product.

Since the arylsulfonic acids are stronger acids than the phenols, to prepare the catalyst of the invention the aluminum aryloxide is reacted with an appropriate quantity of an arylsulfonic acid according to the following equation:

$$Al(OAr)_3 + 3 - nAr'SO_3H \rightarrow Al(OAr)_n(Ar'SO_3)_{3-n} + nArOH$$

Suitable arylsulfonic acids include benzenesulfonic acid, p-toluenesulfonic acid, p-phenolsulfonic acid, m-phenolsulfonic acid, chlorosulfonic acid, and the like.

Alternatively, the catalyst may be made directly by reacting an aluminum metal or an appropriate aluminum salt, preferably an aluminum alkoxide, with a mixture of the desired phenol and arylsulfonic acid in suitable predetermined proportions.

The catalyst of the invention is actually a mixture of salts having as its average composition the formula indicated hereabove. The relative proportion of aryloxide groups and arylsulfonate groups contained in the mixed salt is of particular importance. Comparative Example II shows that aluminum tosylate, a typical aluminum arylsulfonate, has very poor selectivity as an ortho-alkylation catalyst; the o/p ratio being only 2.6. Comparative Example IX shows that aluminum phenoxide, upon exposure to only 3 percent moisture, is hydrolytically unstable and suffers a commercially prohibitive loss in catalytic activity. Surprisingly, the mixed aluminum salt containing aryloxide and arylsulfonate groups in a carefully balanced proportion provides selective ortho-alkylation at an acceptable rate, even after exposure to moisture in an amount sufficient to destroy the effectiveness of aluminum phenoxide.

In the above formula, the value of $n$ must be between 1.5 and 2.5. If the value of $n$ is less than 1.5, the selectivity is poor. If the value of $n$ is greater than 2.5, the stability of the catalyst to moisture is measurably decreased.

The amount of catalyst used generally ranges between about 0.05 and 25 mole percent, based on the number of moles of the material to be alkylated. Although the preferred amount of catalyst varies to some extent with the degree of alkylation desired, if less than 0.05 mole percent catalyst is used, alkylation is quite slow. For economic reasons no advantage is seen in using more than 15 mole percent catalyst, although no adverse effects are obtained thereby. I prefer to use between about 0.3 and 10 mole percent catalyst for ease of reaction and economical operation.

The alkylation reaction is exothermic. It proceeds smoothly at elevated temperatures as low as 50° C. up to the boiling point of the reaction mixture under the particular pressure applied. Most alkylation reactions can be run at temperatures between 50 and 400° C., preferably between 125 and 300° C.

The reaction is run at pressures ranging from atmospheric pressure up to about 3000 p.s.i.g. For the simple alkylations, for example, the alkylation of phenol or cresol with isobutylene or styrene, the reaction proceeds well at atmospheric pressure or low positive pressure and, from the standpoint of equipment cost, the use of these low pressures is most desirable. The more difficult alkylations involving, for example, alkylation with ethylene, high positive pressures in the range of 1200 to 3000 p.s.i.g. are required. It is obviously advantageous for economic reasons to run the reaction at the lowest convenient pressure.

The degree of alkylation depends upon the number of alkylatable positions on the hydroxyaromatic hydrocarbon and the mole ratio of the reactants. Mono-alkylations can be accomplished using from about 0.3–1.2 moles of olefin per mole of hydroxyaromatic compound. It is often convenient, from the standpoint of avoiding dialkylation, to use considerably less than the stoichiometric quantity of olefin. In this case a high ultimate yield of monoalkylated product is obtained by recycle. The use of 0.3–0.9 mole of olefin, accompanied by recycle, is desirable from the standpoint of obtaining a maximum ultimate yield of monoalkylated product. Dialkylated products are obtained according to the invention by using 1.3–2.5 moles of olefin per mole of hydroxyaromatic hydrocarbon. The lower mole ratios within the indicated range are used when it is desired to avoid the formation of trialkylated products.

The reaction time can be conveniently determined by measuring the amount of olefin absorbed by the reaction mixture. Alternatively, the reaction mixture may be repeatedly sampled and the constitution of the samples can be determined by vapor phase chromatography, as shown in the examples that follow.

Conveniently, alkylation is conducted in the absence of a solvent, although, if desired, any solvent which is inert to the reactants and catalyst under the conditions of the reaction can be employed. Suitable solvents include benzene, toluene, xylene, tetralin, decalin, hexane, heptane, cyclohexane, and the like.

The reaction product of the invention, although primarily a mono-ortho- or di-ortho (depending upon the reaction conditions and mole ratio of ingredients) hydroxyaromatic hydrocarbon, also contains unreacted starting material and minor percentages of other isomers.

The product can be isolated by removing the reaction mixture from the catalyst by fractional distillation or by flash distillation, followed by fractional distillation or other separation methods described below.

Alternatively, the product may be isolated by steam distilling the reaction product followed by fractionations or other separation methods described below. These methods are most desirable, since they permit the reuse of the catalyst.

Other means of isolating the product depend on neutralizing the catalyst with base. This may be followed by removal of the deactivated catalyst, fractional distillation, or addition of sufficient base to convert the unhindered phenols contained in the product to their salts. This can now be followed by extraction of the desired compound or compounds with organic, water-immiscible solvents or by steam distillation. These two methods of separating the hindered and unhindered phenols in the presence of base to tie up the unhindered phenols are, of course, also applicable to the first two separations of crude product from the catalyst, as described hereabove.

The operation can be conducted batch-wise or continuously, as desired. Unreacted starting materials and catalyst may be recycled for use in a subsequent run.

The compounds made by the process of my invention have well established uses in the art, such as monomers for phenolic resins, detergent intermediates, germicides, polymerization inhibitors, antioxidants, and the like.

My invention is further illustrated by the following examples:

EXAMPLE I t-Butylation of o-cresol

A mixture of o-cresol, 914 g. (8.45 mole), p-toluenesulfonic acid, 16.1 g. (0.084 mole), and benzene, 50 ml., was refluxed using a Dean-Stark trap to dry the mixture. Aluminum filings, 2.23 g. (0.084 mole), were added, and the mixture was heated at 170–180° C. to form the catalyst. The mixture was charged into a one-gallon stirred autoclave and heated to 120° C. Isobutylene, 900 g. (16 moles) was added at 120° C. and 140–150 p.s.i.g. ($N_2$ + isobutylene) over a six hour period. Samples were taken after 1, 2, 3, and 6 hour reaction periods. The results obtained are shown in Table I.

TABLE I

| Sample | 1 | 2 | 3 | 4 |
|---|---|---|---|---|
| Time (Hours) | 1 | 2 | 3 | 6 |
| | Area Percent | | | |
| o-Cresol | 69.0 | 52.8 | 51.2 | 46.4 |
| Unknown | 3.1 | 3.8 | 4.8 | 4.5 |
| 6-t-butyl-2-methylphenol | 27.8 | 43.3 | 44.0 | 49.1 |
| 4-t-butyl-2-methylphenol | 0 | 0 | 0 | 0 |
| 4,6-di-t-butyl-2-methylphenol | 0 | 0 | 0 | 0 |

As may be seen from the table, the ratio of the ortho- to para-substituted o-cresols was infinite. The conversion to 6-t-butyl-2-methylphenol was 40 percent (assuming area percent equals weight percent). The ultimate yield was 92 percent (based on o-cresol and assuming that the unknown had the same molecular weight as the product, e.g. the ether).

EXAMPLES II–VII

Styrenation of phenols

Phenol was styrenated using a variety of catalysts to show the critical nature of the relative proportions of aryloxide and arylsulfonate groups of the aluminum mixed salt catalyst. Aluminum tosylate was used as a control.

*Example II.*—A mixture of phenol, 99 g. (1.05 moles), aluminum filings, 0.27 g. (0.01 mole), p-toluenesulfonic acid, monohydrate, 5.7 g. (0.03 mole), and benzene, 50 ml., was dried by azeotropic distillation, and heated to 170° C. to form aluminum tosylate. Styrene, 98.4 g. (0.94 mole) was added to the viscous solution at 110–135° C. over a 15 minute period (exothermic reaction). The reaction mixture was heated at 110–135° C. for one hour and sampled. The sample was analyzed by gas chromatography and the results are given in Table II.

*Example III.*—A mixture of phenol, 112 g. (1.19 moles), aluminum filings, 0.275 g. (0.0102 mole), p-toluenesulfonic acid, monohydrate, 4.678 g. (0.0246 mole) and xylene, 50 ml., was refluxed using a Dean-Stark trap to dry the mixture and form aluminum tosylate. Styrene, 100 g. (0.96 mole), was added over a 15 minute period at 140–150° C. The mixture was heated at 150–160° C. for 1.25 hours, and sampled. The sample was analyzed by gas chromatography. The results of this analysis are given in Table II.

*Example IV.*—A mixture of phenol, 106 g. (1.12 moles), aluminum filings, 0.269 (0.01 mole) and xylene, 50 ml., was refluxed using a Dean-Stark trap to dry the phenol and to form aluminum phenoxide. p-toluenesulfonic acid, monohydrate, 3.79 g. (0.02 mole) was added, and the mixture was refluxed for another hour to remove the water of hydration. Styrene, 104 g. (1.10 moles), was added to the mixture at 120–130° C. over a 15 minute period. The mixture was heated at 130–140° C. for two hours. The mixture was sampled after one and two hours reaction time. Gas chromatographic analysis of these samples indicated that the reaction was essentially complete after one hour. The results of the analysis of the first sample are given in Table II.

*Example V.*—A mixture of phenol, 103 g. (1.09 moles), aluminum filings, 0.272 (0.0101 mole), p-toluenesulfonic acid, monohydrate, 3.39 g. (0.0178 mole), and xylene was refluxed using a Dean-Stark trap for 1.5 hours. Styrene, 106 g. (1.02 moles) was added at 150° C. over a 15 minute period with the temperature of the reaction mixture dropping to 120° C. during the addition period. The mixture was heated at 140–150° C. for 2.25 hours, and sampled. The sample was analyzed by gas chromatography. The results of this analysis are given in Table II.

*Example VI.*—A mixture of phenol, 111 g. (1.18 moles), aluminum filings, 0.27 g. (0.01 mole), p-toluenesulfonic acid, monohydrate, 2.8 g. (0.014 mole), and xylene, 50 ml., was refluxed for 1.5 hours using a Dean-Stark trap to remove water. Styrene, 99 g. (0.95 mole) was added at 120–130° C. over a 15 minute period. The mixture was heated at 130–175° C. (exotherm) for one hour and sampled. The sample was analyzed by gas chromatography and the results are given in Table II.

*Example VII.*—A mixture of phenol, 103 g. (1.09 moles), p-toluenesulfonic acid, monohydrate, 1.90 g. (0.010 mole), aluminum filings, 0.268 g. (0.0099 mole), and benzene, 50 ml. was refluxed using a Dean-Stark trap to dry the mixture. The benzene was then distilled to increase the temperature of the mixture to form the catalyst, (ca. 170° C.). Styrene, 150 g. (1.01 moles), was added at 164–170° C.) over a 15 minute period. The reaction mixture was heated at 170–180° C. for one hour and sampled. The sample was analyzed by gas chromatography. The results of this analysis are given in Table II.

TABLE II

| Example | Catalyst [1] | Gas Chromatographic Analysis in Area Percent [2] | | | | | | | o/p Ratio | 2,6-BMBP / 2,4-BMBP Ratio |
|---|---|---|---|---|---|---|---|---|---|---|
| | | Reaction | | Phenol | OMBP | PMBP | 2,6-BMBP | 2,4-BMBP | | |
| | | Temp./°C. | Time/Hrs. | | | | | | | |
| II | Al(OTs)$_3$ | 110–135 | 1.0 | 26.3 | 39.9 | 17.1 | 6.5 | 10.2 | 2.3 | 0.63 |
| III | Al(Oφ)$_{0.5}$(OTs)$_{2.5}$ | 150–160 | 1.25 | 21.2 | 40.4 | 13.1 | 10.1 | 15.1 | 3.1 | 0.67 |
| IV | Al(Oφ).(OTs)$_2$ | 130–140 | 1.0 | 20.2 | 39.2 | 10.4 | 14.4 | 15.7 | 3.7 | 0.92 |
| V | Al(Oφ)$_{1.3}$(OTs)$_{1.7}$ | 140–150 | 2.25 | 17.3 | 50.3 | 8.2 | 12.4 | 11.6 | 6.1 | 1.1 |
| VI | Al(Oφ)$_{1.6}$(OTs)$_{1.4}$ | 130–170 | 1.0 | 21.2 | 63.6 | 3.4 | 11.8 | | 18.7 | |
| VII | Al(Oφ)$_2$(OTs) | 164–185 | 1.0 | 14.8 | 61.6 | 2.7 | 15.9 | 4.9 | 22.4 | 3.2 |

[1] (OTs)=tosylate, (Oφ)=phenoxy.
[2] Abbreviations OMBP, PMBP, BMBP are used to designate o-(α-methylbenzyl)phenol, p-(α-methylbenzyl)phenol and bis(α-methylbenzyl)phenol, respectively.

EXAMPLE VIII

Styrenation of phenol

A mixture of phenol, 94 g. (1.00 mole), water, 7 ml., aluminum isopropoxide, 2.5 g. (0.010 mole) and xylene, 50 ml., was heated at 100° C. for 16 hours. p-Toluenesulfonic acid, monohydrate, 1.9 g. (0.010 mole) was added and the mixture was dried by azeotropic distillation over a three hour period. Styrene, 93.6 g. (0.90 mole), was added over a 15 minute period at 160–170° C. The mixture was heated at 160–180° C. for one hour and sampled. The sample was analyzed by gas chromatography and the results showed 16.5 (area) percent phenol, 61.4 percent o-(α-methylbenzyl)phenol, 2.8 percent para-isomer, 16.6 percent 2,6-bis(α-methylbenzyl)-phenol and 2.8 percent of the 2,4-isomer. This example clearly illustrates the remarkable hydrolytic stability of the novel catalyst system of the invention.

EXAMPLE IX

Styrenation of phenol

The procedure of Example VIII was repeated except that p-toluenesulfonic acid was not added. The reaction mixture was sampled after two and four hours at reflux temperature. The results of gas chromatographic analysis of these samples showed 89.3 (area) percent and 68.9 percent of phenol, respectively; 8.9 and 29.0 percent o-(α-methylbenzyl)phenol, respectively; and 1.8 and 2.1 percent para-isomer, respectively.

It can be seen from this example that water has a deleterious effect on the activity of aluminum phenoxide, even after rigorous attempts have been made to remove all traces of moisture.

EXAMPLE X

Styrenation of phenol

A mixture of phenol, 94 g. (1.00 mole), sulfuric acid, 1.0 g. (0.010 mole) and benzene, 50 ml., was refluxed under a one-foot column to remove water and to form phenolsulfonic acid. Aluminum filings, 0.26 g. (0.010 mole) and xylene, 50 ml., were added to the mixture and the mixture was distilled to remove benzene and to form the catalyst. Styrene, 93.6 g. (0.9 mole) was added at 160–165° C. over a 15 minute period. The mixture was heated at 160–165° C. for one hour and sampled. The sample was analyzed by gas chromatography and the results showed 17.0 (area) percent phenol, 69.3 percent o-(α-methylbenzyl)phenol, 2.3 percent para-isomer, 11.3 percent 2,6-bis(α-methylbenzyl)phenol and no 2,4-isomer.

EXAMPLE XI t-Butylation of o-cresol

A mixture of o-cresol, 1026 g. (9.50 moles), p-toluenesulfonic acid, 36 g. (0.19 mole) and benzene, 50 ml., was refluxed using a Dean-Stark trap to dry the mixture. Aluminum filings, 5.4 g. (0.20 mole) were added and the mixture was refluxed at 180° C. for two hours to form the catalyst. The mixture was transferred to a one-gallon autoclave and heated to 120° C. Isobutylene, 560 g. (10.0 moles) was added at 120° C./140 p.s.i.g. ($N_2$+isobutylene).

An exothermic reaction occurred during the first 0.5 hour requiring water cooling to maintain reaction temperature of 120–130° C. The reaction mixture was sampled after 0.5, 1, 2, 3, 4 and 6 hours. The samples were analyzed by gas chromatography, with the results shown in Table III.

TABLE III

| Sample | 1 | 2 | 3 | 4 | 5 |
|---|---|---|---|---|---|
| Time (Hrs.) | 0.5 | 1 | 2 | 3 | 6 |
| | Area Percent ||||||
| o-Cresol | 12.9 | 6.3 | 7.6 | 7.6 | 5.7 |
| 6-t-butyl-2-methylphenol | 70.5 | 76.9 | 74.7 | 72.5 | 75.2 |
| 4-t-butyl-2-methylphenol | 3.1 | 3.5 | 3.5 | 3.8 | 3.8 |
| 4,6-di-t-butyl-2-methylphenol | 13.5 | 13.3 | 14.1 | 16.1 | 15.3 |

EXAMPLE XII t-Butylation of phenol

A mixture of phenol, 672 g. (7.15 moles), p-toluenesulfonic acid, monohydrate, 5.7 g. (0.030 mole), aluminum filings, 0.81 g. (0.030 mole) and benzene, 50 ml., was refluxed to form the catalyst and dry the reaction mixture. The mixture was charged into a one-gallon autoclave and heated to 120° C. Isobutylene was added at 120–130° C./120–140 p.s.i.g. ($N_2$+isobutylene) over a 5.75 hour period with periodic sampling. Addition was completed at 150° C. The samples taken at various time intervals were analyzed by gas chromatography. The results were as follows:

TABLE IV

| Sample | 1 | 2 | 3 | 4 | 5 |
|---|---|---|---|---|---|
| Time (Hrs.) | 1 | 2 | 4 | 5.75 | 7.00 |
| | Area Percent |||||
| Phenol | 50.5 | 42.2 | 29.7 | 27.4 | 21.3 |
| Unknown | 13.6 | 13.6 | 15.4 | 11.5 | 8.9 |
| o-t-Butylphenol | 26.5 | 32.8 | 38.8 | 40.7 | 49.4 |
| p-t-Butylphenol | 3.1 | 3.8 | 3.4 | 3.5 | 2.6 |
| 2,6-di-t-butylphenol | 2.7 | 3.3 | 5.1 | 6.2 | 7.1 |
| 2,4-di-t-butylphenol | 3.4 | 4.3 | 6.3 | 6.2 | 8.0 |
| 2,4,6-tri-t-butylphenol | 0 | 0 | 1.1 | 2.6 | 2.6 |

The temperature of the autoclave was raised to 150° C. and a final sample was taken after a total reaction time of seven hours. The analysis of this sample is included in the above table.

EXAMPLE XIII

Di-t-butylation of phenol

A mixture of phenol, 520 g. (5.53 moles), aluminum filings, 5.1 g. (0.186 mole), and p-toluenesulfonic acid, 36 g. (0.19 mole) was refluxed to form the catalyst. The mixture was charged into a one-gallon stirred autoclave and heated to 100° C. Isobutylene, 800 g. (14.3 moles) was added over the liquid level at 140–150 p.s.i.g. The mixture was maintained at 100–105° C. for four hours and samples were taken after each hour. The mixture was heated to 120° C. over a one hour period and kept at 120° C. for one hour. Samples were taken upon reaching 120° C. and after one hour at 120° C. The samples taken were analyzed by gas chromatography as shown in Table V.

TABLE V

| Sample | 1 | 2 | 3 | 4 | 5 | 6 |
|---|---|---|---|---|---|---|
| Time (Hrs.) | 1 | 2 | 3 | 4 | 5 | 6 |
| | Area Percent ||||||
| Phenol | 60.7 | 41.1 | 29.4 | 16.0 | 2.9 | 1.6 |
| 2-t-butylphenol | 29.5 | 33.6 | 42.3 | 42.4 | 28.1 | 23.0 |
| 4-t-butylphenol | 4.5 | 9.3 | 5.8 | 6.4 | 3.7 | 3.6 |
| 2,6-di-t-butylphenol | 2.7 | 8.4 | 14.1 | 22.4 | 48.1 | 52.4 |
| 2,4-di-t-butylphenol | 2.7 | 5.6 | 5.1 | 7.2 | 5.2 | 5.2 |
| Tri-t-butylphenol | | 1.9 | 3.2 | 5.6 | 11.8 | 14.1 |

EXAMPLE XIV

Isopropylation of m-cresol

A mixture of m-cresol, 1068 g. (9.9 moles), p-toluenesulfonic acid, monohydrate, 9.5 g. (0.05 mole) and benzene was dried by azeotropic distillation. Aluminum filings, 1.35 g. (0.05 mole) was added and the mixture refluxed for one hour to form the catalyst. The mixture was charged into a one-gallon stirred autoclave and heated to 230° C. Propylene was added over the liquid level under its own presence, 140–150 p.s.i.g. over a three hour period. The mixture was sampled at various time intervals. The samples were analyzed by gas chromatography with the following results:

TABLE VI

| Sample | 1 | 2 | 3 | 4 |
|---|---|---|---|---|
| Time (Hrs.) | 1 | 3 | 6 | 20.5 |
| | Area Percent ||||
| m-Cresol | 68.8 | 50.7 | 49.7 | 48.2 |
| Thymol and 2-isomer | 26.2 | 34.2 | 37.3 | 37.3 |
| 5-isomer | 0 | 0 | 0 | 0 |
| 4-isomer | 3.7 | 11.0 | 8.9 | 9.0 |
| Diisopropyl-m-cresols | 1.2 | 4.0 | 4.1 | 5.4 |

An aliquot portion of the reaction mixture was neutralized with 50 percent aqueous sodium hydroxide and distilled through a two-foot column at 50 mm. Hg. The following fractions were obtained: (1) forerunnings (to 120° C.), 1.6 g.; (2) m-cresol (120–123° C.), 70.0 g.; (3) intermediate I (72 percent m-cresol, 28 percent thymol and 2-isomer; 123–140° C.), 10.5 g.; (4) thymol fraction (140–146° C.), 55.7 g.; intermediate II (30 percent thymol and 2-isomer, 31 percent 4- and 5-isomer plus unknowns; 146–160° C.), 16.6 g.; and intermediate III (30 percent thymol isomers, 33 percent diisopropyl-m-cresols, plus unknowns).

I claim:
1. In a process for the selective catalytic ortho-alkylation of a hydroxyaromatic hydrocarbon containing at least one reactive hydrogen in a position ortho- to a hydroxyl group wherein said hydrocarbon is reacted with an olefin at an elevated temperature and a pressure up to 3000 p.s.i.g., the improvement comprising conducting the reaction in the presence of a catalytic amount of a mixed salt of aluminum having the empirical formula:

$$Al(OAr)_n \cdot (Ar'SO_3)_{3-n}$$

wherein Ar and Ar' are aryl radicals independently selected from the group consisting of phenyl, lower alkylphenyl, m-hydroxyphenol, p-hydroxyphenol and halophenyl and $n$ has an average value of 1.5–2.5.

2. In a process for the selective catalytic ortho-alkylation of a hydroxyaromatic hydrocarbon containing at least one reactive hydrogen in a position ortho- to a hydroxyl group wherein said hydrocarbon is reacted with an olefin at an elevated temperature and a pressure up to 3000 p.s.i.g., the improvement comprising conducting the reaction in the presence of 0.05–15 mole percent, based on the number of moles of hydroxyaromatic hydrocarbon being subjected to alkylation, of a mixed salt of aluminum having the empirical formula:

$$Al(OAr)_n \cdot (Ar'SO_3)_{3-n}$$

wherein Ar and Ar' are aryl radicals independently selected from the group consisting of phenyl, lower alkylphenyl, m-hydroxyphenyl, p-hydroxyphenyl and halophenyl and $n$ has an average value of 1.5–2.5.

3. A process for the selective ortho-alkylation of phenol comprising reacting phenol with up to 2.5 moles, per mole of phenol, of an olefin having up to 20 carbon atoms at a temperature of 50–400° C. at a pressure of up to 1200 ps.i.g. in the presence of 0.3–10 mole percent, based on the number of moles of phenol, of a mixed salt of aluminum having the empirical formula:

$$Al(OAr)_n \cdot (Ar'SO_3)_{3-n}$$

wherein Ar and Ar' are aryl radicals independently selected from the group consisting of phenyl, lower alkylphenyl, m-hydroxyphenyl, p-hydroxyphenyl and halophenyl and $n$ has an average value of 1.5–2.5.

4. A process for the selective ortho-alkylation of cresol comprising reacting cresol with up to 2.5 moles, per mole of cresol, of an olefin having up to 20 carbon atoms at a temperature of 50–400° C. at a pressure of up to 1200 p.s.i.g. in the presence of 0.3–10 mole percent, based on the number of moles of cresol, of a mixed salt of aluminum having the empirical formula:

$$Al(OAr)_n \cdot (Ar'SO_3)_{3-n}$$

wherein Ar and Ar' are aryl radicals independently selected from the group consisting of phenyl, lower alkylphenyl, m-hydroxyphenyl, p-hydroxyphenyl and halophenyl and $n$ has an average value of 1.5–2.5.

5. A process for the selective ortho-t-butylation of phenol comprising reacting phenol with up to 2.5 moles, per mole of phenol, of isobutylene at a temperature of 125–300° C. at a pressure of up to 1200 p.s.i.g. in the presence of 0.5–10 mole percent, based on the number of moles of phenol, of aluminum diphenoxy tosylate.

6. A process for the selective ortho-styrenation of phenol comprising reacting phenol with up to 2.5 moles, per mole of phenol, of styrene at a temperature of 125–300° C. at a pressure of up to 1200 p.s.i.g. in the presence of 0.5–10 mole percent, based on the number of moles of phenol, of aluminum diphenoxy tosylate.

7. A process for the selective ortho-isopropylation of m-cresol comprising reacting m-cresol with up to 2.5 moles, per mole of m-cresol, of propylene at a temperature of 125–300° C. at a pressure of up to 1200 p.s.i.g. in the presence of 0.5–10 mole percent, based on the number of moles of m-cresol, of aluminum diphenoxy tosylate.

No references cited.

LEON ZITVER, *Primary Examiner.*

D. M. HELFER, *Assistant Examiner.*